Feb. 7, 1956
M. L. TROTTER
2,733,573
FUEL TANK WITH RESERVE COMPARTMENT
Filed Dec. 1, 1954
2 Sheets-Sheet 2
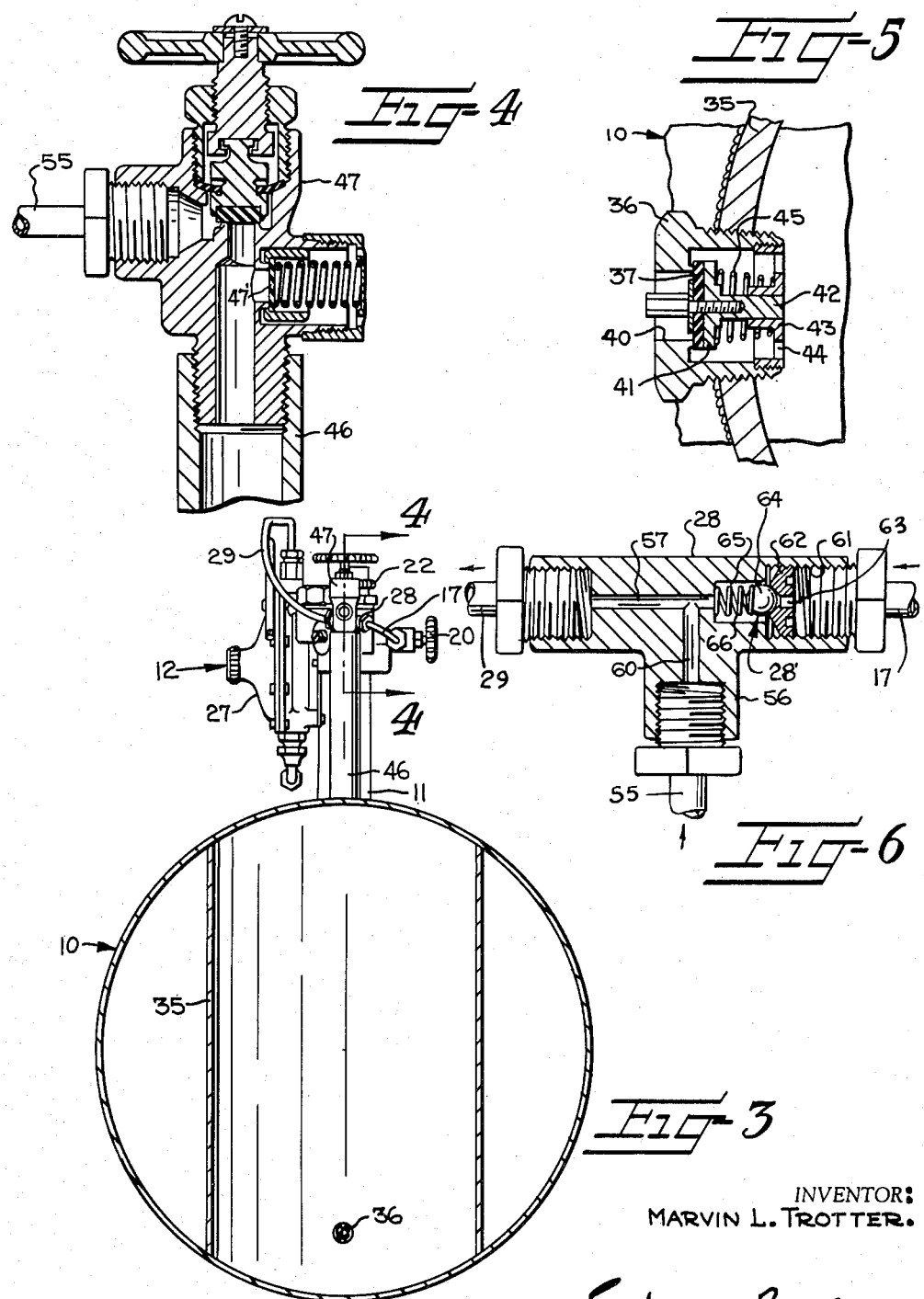
INVENTOR:
MARVIN L. TROTTER.
BY Eaton + Bell
ATTORNEYS United States Patent Office 2,733,573
Patented Feb. 7, 1956

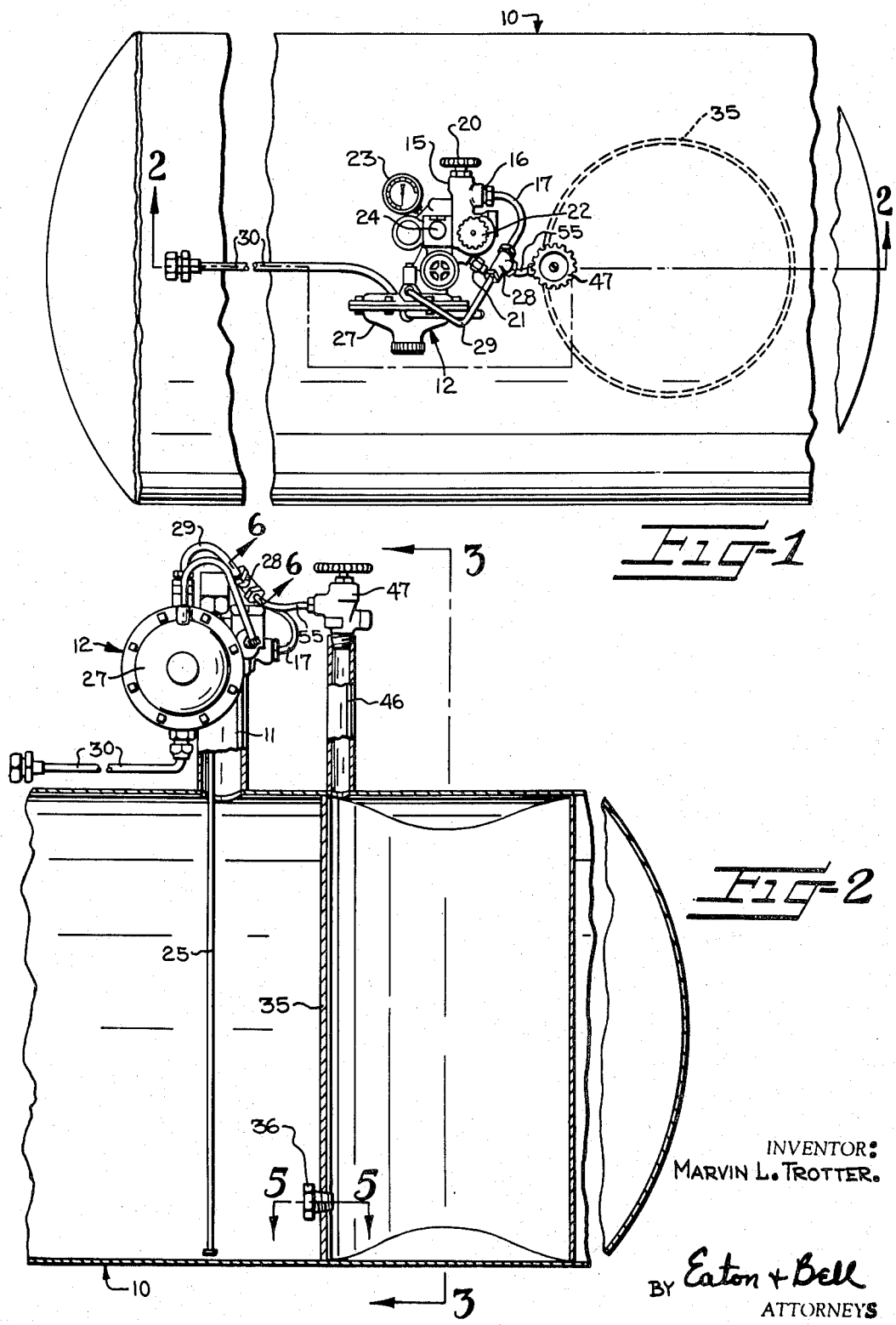

2,733,573

FUEL TANK WITH RESERVE COMPARTMENT

Marvin L. Trotter, Columbia, S. C.

Application December 1, 1954, Serial No. 472,407

4 Claims. (Cl. 62—1)

This invention relates to fuel tanks or pressure vessels of the type for containing pressurized fuel or gas such as propane; a gaseous hydrocarbon of the methane series $C_3H_8$, obtained from petroleum or similar fuels used for heating and cooking purposes.

In order to provide a readily available source of liquefied petroleum gas or other pressurized gas for use in a home or manufacturing plant and wherein the gas may be readily available for use in cook stoves, heaters and for any other desired purpose, it is customary to provide an airtight or sealed storage container or tank which is preferably buried in the ground adjacent the home or manufacturing plant and which is connected by a fuel line to the respective appliances within the home or manufacturing plant.

Heretofore, difficulty has been experienced in the past by consumers of such gas in that, when the supply of gas within the tank became exhausted, considerable delay and inconvenience was occasioned before the proprietor of the gas service was able to refill the storage container or tank.

It is therefore an object of this invention to provide a relatively small auxiliary or reservoir container or compartment within a relatively large pressure tank with a conventional valving system connected to the main tank having means for receiving and directing into the main tank a pressurized fuel or liquefied petroleum gas and also having means for metering the gas under constant pressure into the fuel service line extending to the gas burning appliance or appliances and wherein a check valve is provided in the wall of the auxiliary tank or compartment for permitting the pressurized fuel, when admitted through the main tank, to also enter the auxiliary tank or compartment. Conduit means having a manually controlled valve interposed therein connects the auxiliary tank or compartment with the aforementioned system and, upon the gas in the main fuel container or tank being exhausted, the check valve in the wall of the auxiliary tank or compartment prevents the pressurized fuel therein from escaping into the main tank thereby maintaining the gas in the auxiliary tank under a desired predetermined pressure to permit the gas in the auxiliary tank to be metered into the service line by opening the manually controlled valve to permit the pressurized fuel to pass from the auxiliary fuel tank or compartment into the valving system. Additional check valve means are provided in the valving system to prevent the fuel introduced thereinto from the auxiliary tank from passing back into the main tank.

Some of the objects of the invention having been stated, other objects will appear as the description proceeds, when taken in connection with the accompanying drawings, in which—

Figure 1 is a top plan view of a fuel supply unit embodying the features of the present invention and wherein portions of the main fuel tank are broken away;

Figure 2 is a fragmentary vertical sectional view taken substantially along line 2—2 in Figure 1;

Figure 3 is a transverse vertical sectional view through the main tank and the auxiliary tank or compartment taken along line 3—3 in Figure 2;

Figure 4 is a vertical sectional view through the manually operable valve interposed in the conduit means between the conventional valving system and the auxiliary compartment;

Figure 5 is a fragmentary sectional plan view taken along line 5—5 in Figure 2 showing the check valve for admitting the pressurized fuel from the main tank into the auxiliary tank or compartment and for preventing the pressurized fuel from escaping from said auxiliary tank when the pressurized fuel in the main tank is exhausted;

Figure 6 is an enlarged longitudinal sectional view taken substantially along line 6—6 in Figure 2, showing a combination pipe fitting and check valve removed from the conventional valving system and which is used for connecting the conduit means leading from the auxiliary tank to the conventional valving system.

Referring more specifically to the drawings, the numeral 10 indicates a relatively large sealed main tank or fuel storage container which is adapted to contain a gaseous or pressurized fuel such as liquefied gas and the upper portion of which has the lower end of a stand pipe 11 of a conventional valving system broadly designated at 12 communicatively connected thereto. The conventional valving system 12 may be of the type such as is fully disclosed in a catalog L-500 dated June 1950 and distributed by The Bastian-Blessing Company, 4201 West Peterson Avenue, Chicago 30, Illinois, and, since the valving system generally in use for metering liquefied petroleum gas to a fuel feed line is well known in the art, only so much of the valving system 12 will be described as is necessary to a clear understanding of the present invention.

The conventional valving system includes a composite valve 15 which may be of a type known as a Rego Multivalve No. 1475 as manufactured by said company. The composite valve 15 communicates with and is connected to the upper end of the stand pipe 11 and has an outlet 16 thereon to which one end of a tube, pipe or conduit 17 is communicatively connected. The outlet 16 may be manually opened and closed by means of a suitable valve mechanism, not shown, controlled by a hand wheel 20. The composite valve 15 also has a filler plug 21 connected thereto which may be removed for filling the tank 10 with pressurized gas, when desired. The opening formed in the composite valve 15 when the filler plug 21 is removed may also be closed by conventional valve mechanism, not shown, under control of a hand wheel or knob 22.

The composite valve 15 also has a pressure indicating gage 23 and liquid level indicating gage 24 connected thereto, the liquid level being transmitted to the gage 24 by conventional slip tube 25 extending downwardly through the stand pipe 11 and into the tank 10. A conventional metering valve or pressure reducing valve 27 is suitably attached to the housing of the multivalve or composite valve 15 and to the upper portion of which the end of pipe 17 remote from the composite valve 15 is usually connected.

However, in this instance a pipe fitting 28 having a T-check valve assembly 28′ therein, which forms a part of the present invention, is provided and the end of pipe 17 remote from the outlet 16 of the composite valve 15 is connected to one end of the combination pipe fitting and check valve 28 and the other end of the combination pipe fitting and check valve assembly 28 has one end of a pipe, conduit or tube 29 connected thereto whose other end is communicatively connected to the upper portion of the metering valve or pressure reducing valve 27. The lower portion of the pressure reducing valve 27 has one end of a fuel feed line 30 connected thereto whose other end may be connected to any suitable gas burning appliance.

The pressure reducing valve is conventional and a detailed description thereof is deemed unnecessary. It might be stated that this pressure reducing valve 27 serves to maintain the flow of gas through the pipe 30 under constant pressure regardless of the relatively high pressure existing in the tank 10 or the auxiliary tank to be presently described. With the exception of the pipe fitting 28 having a check valve assembly 28' therein, the parts heretofore described are conventional and it is with such or similar parts that the present invention is particularly adapted to be associated.

It will be observed in Figures 1, 2 and 3 that the main tank 10 has a relatively small auxiliary tank or compartment 35 therein which is preferably in the form of a tube or cylinder extending diametrically across and within the main tank 10 and being connected to diametrically opposed portions of the inner periphery of the main tank 10. The auxiliary tank 35 is also sealed to prevent the pressurized fuel or gas from escaping therefrom into the main tank 10.

The lower portion of the wall of the auxiliary tank or compartment 35 has a check valve assembly 36 therein which may be of any desired construction to permit the pressurized fuel, when admitted into the main tank 10 to pass therefrom into the auxiliary tank 35 but to prevent the pressurized fuel in the auxiliary tank 35 from flowing back into the main tank 10 upon the pressure of the fuel in the main tank 10 being reduced below an operating minimum or being completely exhausted.

The housing of the check valve assembly 36 has a check valve in the form of a resilient disk 37 therein which normally closes a passageway 40 formed in the housing of the valve assembly 36. The disk 37 is fixed on a check valve support 41 having a stem 42 thereon which is loosely mounted in a guide 43 having a plurality of openings 44 therein and which guide is fixed in the inner portion of the housing of valve assembly 36. The check valve support 41 is engaged by a compression spring 45 which also engages the guide 43 and thus normally urges the valve member 37 against its seat to normally close the passageway 40.

It is apparent that upon the pressurized fuel under sufficient pressure being introduced into the tank 10, the valve 37 is opened to permit the pressurized fuel to pass into the auxiliary tank 35 and, whenever the pressure of the fuel in the two tanks is equalized or the fuel in the main tank drops below a predetermined minimum pressure or is exhausted, the valve 37 closes to prevent the pressurized fuel from passing from the auxiliary tank 35 back into the main tank 10.

As heretofore stated, conduit means are provided having a manually operable valve interposed therein for selectively establishing communication between the auxiliary tank 35 and the conventional valving system 12. To this end, the portion of the upper portion of the main tank 10 forming the upper wall of the auxiliary compartment or tank 35 has the lower end of a rigid upright or second stand pipe 46 communicatively connected thereto, to the upper end of which a manually operable valve 47 is connected. Although the manually operable valve 47 is shown in detail in Figure 4, it is apparent that there are many different types of manually operable valves which may be used for the intended purpose and, therefore, a detailed description thereof is deemed unnecessary. The particular valve shown in Figure 4 is provided with a safety relief valve 47' and the composite valve 47 is of a type known as a Rego cylinder valve manufactured by said aforementioned company under their No. 3103CO. The side of the manually operable valve 47 remote from the second stand pipe 46 has a conduit, tube or pipe 55 connected thereto whose other end is connected to a branch 56 on said pipe fitting 28, the pipe fitting 28 being shown in the form of a pipe T in Figures 1, 2 and 6.

It will be noted in Figure 6 that the pipe fitting 28 has a longitudinally extending passageway 57 therein which communicates with a radial passageway 60 extending axially through the branch 56 to permit gas or pressurized fuel to flow between the pipes 29 and 55, when desired. The pipe 17 is connected to the end of the fitting 28 remote from the end to which pipe 29 is connected.

A valve seat member 62, which is a part of check valve assembly 28', is threadably mounted in the end of the pipe fitting 28 adjacent pipe 17 and has passageway 63 in the center thereof which is normally closed by a ball check valve 64 loosely mounted in a bore 65 which communicates with the passageway 57 and which ball check valve 64 is normally urged to closed position, to close the passageway 63 by means of a compression spring 66.

Now, when there is sufficient gas or pressurized fuel in the main tank 10, the manually operable valve 47 is closed and it is apparent that fuel then flows from the main tank 10, through the stand pipe 11 and the composite valve 15, and through the pipe 17. The pressure of the fuel unseats the ball check valve 64 (Figure 6) and the fuel then flows through the fitting 28 from pipe 17 and passes through the pipe 29 where it is metered into the fuel feed line 30 in a conventional manner by the conventional metering valve or pressure reducing valve 27.

Now, when the pressure of the fuel in the main tank 10 is insufficient to permit the gas burning appliances to function properly or the supply of fuel in the main tank 10 is completely exhausted, the manually operable valve 47 is opened by an operator to again effect the flow of the fuel through the feed line 30 under proper pressure, since the pressurized fuel in the reserve tank or auxiliary tank 35 then flows through the second stand pipe 46, valve 47, pipe 55 and successively through the passageways 60, 57 in the fitting 28 and thence through the pipe 29, metering valve 27 and into pipe 30. It is apparent that the fuel passing through the passageways 60, 57 could not escape back into the main tank 10 because of the ball check valve 64 (Figure 6) then being seated and closing the opening 63 in the valve seat member 62.

It is thus seen that I have provided a novel fuel supply unit comprising a main tank adapted to contain a service supply of fuel and having a conventional valving system for directing the fuel from the main tank to the fuel feed line extending to the gas burning appliances and wherein I have provided an auxiliary tank or reserve tank within the main tank for containing a reserve supply of pressurized fuel and wherein, upon the pressurized fuel in the main tank being exhausted, service may immediately be restored by merely opening the valve 47 thereby continuing the flow of fuel to the gas burning appliances until the main tank is refilled.

It will also be noted that I have provided means whereby the reserve fuel tank 35 is automatically refilled simultaneously with the main tank 10 being refilled.

I claim:

1. In a fuel supplying apparatus for pressurized fuel having a main fuel container and fuel supply, a valving system and a fuel feed line extending from said valving system adapted to be connected to a gas appliance, said valving system including a first valve communicatively connected with the interior of the main tank, a second pressure reducing valve to which the fuel line is communicatively connected and a first conduit means connecting the first valve with the pressure reducing valve; the combination of an auxiliary tank disposed within the main tank, first check valve means in the lower portion of the auxiliary tank and being adapted to permit fuel under pressure to enter the auxiliary tank from the main tank but to prevent the fuel from escaping from the auxiliary tank into the main tank, second check valve means interposed in the first conduit means, a second conduit means communicatively connected to the auxiliary tank and to the first conduit means at a point between the second pressure reducing valve and the second check valve means, a manually operable valve interposed in the second conduit means, said second check valve permitting the flow of fuel from the first valve to the second pressure reducing valve and preventing the flow of fuel from the auxiliary tank to the first valve, whereby, upon the fuel in the main tank being exhausted, the manually operable valve may be opened to permit fuel to flow from the auxiliary tank through the second conduit means into the pressure reducing valve and into the fuel feed line.

2. In a fuel supplying apparatus for pressurized fuel having a main fuel container and fuel supply, a service line adapted to be connected to a gas appliance and first conduit means communicatively connecting the interior of the main tank with the service line; the combination of an auxiliary tank disposed within the main tank, first check valve means in the auxiliary tank adapted to permit fuel under pressure to enter the auxiliary tank from the main tank but to prevent the fuel from escaping from the auxiliary tank into the main tank, second check valve means interposed in the first conduit means, a second conduit means communicatively connected to the auxiliary tank and to the first conduit means at a point between the service line and the second check valve means, and a manually operable normally closed valve interposed in the second conduit means, whereby the manually operable valve may be opened to permit fuel to flow from the auxiliary tank through the second conduit to the first conduit and into the service line, and said second check valve means in said first conduit being so arranged as to prevent the pressurized fuel from flowing from said auxiliary tank into the main tank.

3. In a fuel supply apparatus for pressurized fuel having a main tank, a service line and a first conduit leading from said main tank to said service line; the combination of an auxiliary tank disposed within said main tank, said auxiliary tank extending between two opposed portions of said main tank and said opposed portions serving as closure means for opposite ends of said auxiliary tank, a passageway communicating with the interior of said auxiliary tank and said main tank and first check valve means disposed in said passageway, said first check valve means permitting passage of fuel in one direction from said main tank to said auxiliary tank and preventing passage of fuel in the opposite direction, second check valve means disposed in said first conduit between said service line and said main tank, a second conduit communicatively connected to said auxiliary tank and to said first conduit at a point between said second check valve and said service line, normally closable valve means in said second conduit normally preventing fuel from flowing from said auxiliary tank into said first conduit, and said second check valve permitting fuel to flow in one direction only toward said service line.

4. In a pressurized fuel system having a main tank for containing pressurized fuel, a service line adapted to be connected to an appliance and first conduit means communicatively connecting the interior of the main tank with the service line; the combination of an auxiliary tank, first check valve means interposed between the main tank and the auxiliary tank and adapted to permit fuel under pressure to enter the auxiliary tank from the main tank but to prevent fuel from escaping from the auxiliary tank into the main tank, second check valve means interposed in the first conduit means, a second conduit means communicatively connected to the auxiliary tank and to the first conduit means at a point between the service line and the second check valve means, and a manually operable normally closed valve interposed in the second conduit means, whereby the manually operable valve may be opened to permit fuel to flow from the auxiliary tank through the second conduit to the first conduit and into the service line, and said second check valve means in said first conduit being so arranged as to prevent the pressurized fuel from flowing from said auxiliary tank into the main tank.

References Cited in the file of this patent

UNITED STATES PATENTS

| | | |
|---|---|---|
| 1,958,155 | Watkins | May 19, 1934 |
| 2,565,872 | Melsheimer | Aug. 28, 1951 |
| 2,651,921 | Durant | Sept. 15, 1953 |